March 27, 1934.  P. L. PRINS  1,952,564
ELASTIC COUPLING FOR COAXIAL ROTARY PARTS
Filed Dec. 15, 1931
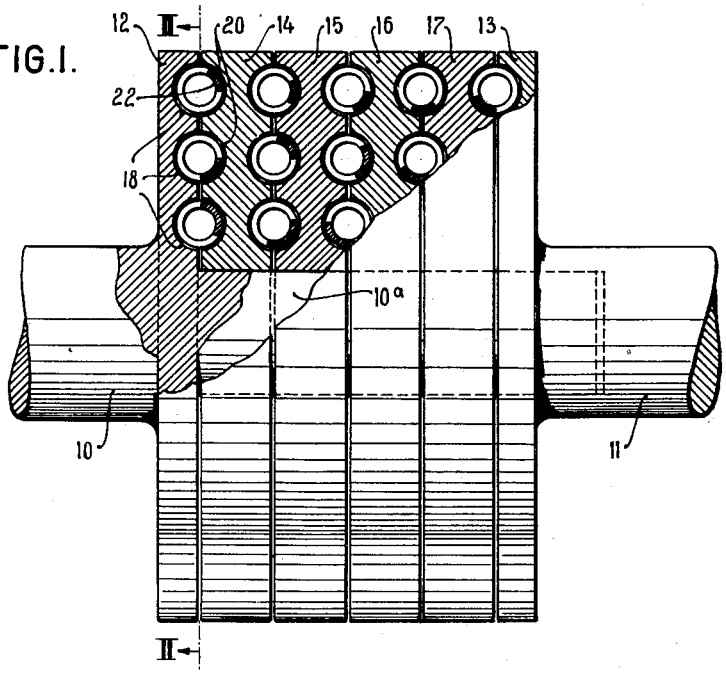
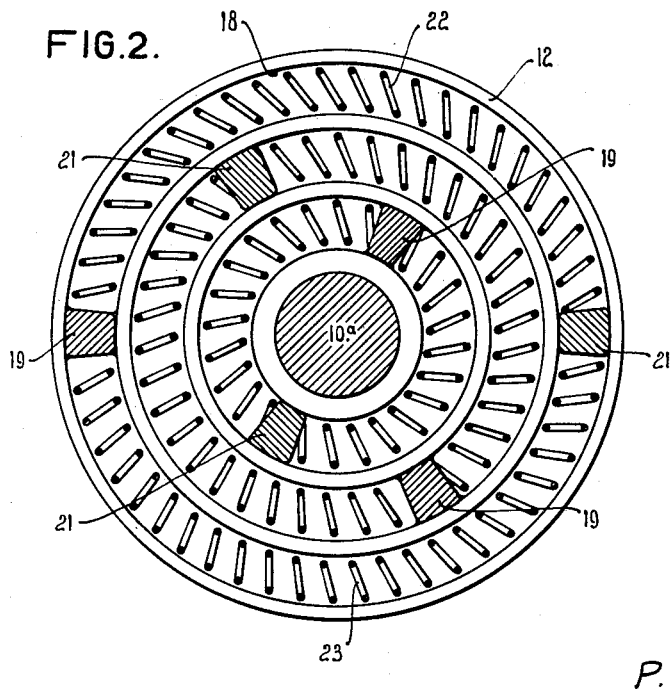
P. L. Prins
INVENTOR
By: Marks & Clerk
ATTys Patented Mar. 27, 1934

1,952,564

UNITED STATES PATENT OFFICE 1,952,564

ELASTIC COUPLING FOR COAXIAL ROTARY PARTS

Peter Lourens Prins, Hilversum, Netherlands

Application December 15, 1931, Serial No. 581,233
In Germany December 15, 1930

3 Claims. (Cl. 64—96)

This invention relates to elastic couplings for coaxial, rotary parts of the kind in which two or more discs are disposed between the said parts, each pair of adjacent discs being coupled together by resilient members interposed between inwardly directed abutments on the discs, one end disc of the series being fixed to a driving part and the other end disc to a driven part.

It is known, in a coupling of this kind, to couple adjacent discs by means of sets of helical springs arranged within an annular space between the discs. According to the present invention the adjacent discs are coupled through a plurality of annular springs concentrically disposed at different radial distances from the axis of said discs. This arrangement permits distribution of the energy transmitted from one disc to the next to be divided over the several springs so that, as compared with the interposition of one spring between the adjacent discs for each direction of rotation, the springs in accordance with this invention may be made considerably lighter. Alternatively the springs, if of the same strength as in the case of a single spring, would permit of the transmission of a greater amount of energy. A further advantage of the arrangement according to this invention consists in the reduction of the length of the coupling.

The invention also contemplates other features of construction and arrangement of parts all of which will be apparent from consideration of the following detailed description, reference being made therein to the accompanying drawing in which:

Figure 1 is a side elevation, partly in section, of a preferred construction of coupling and Figure 2 is a transverse section thereof.

Referring to the drawing, 10 designates a driving shaft and 11 a driven shaft coaxially aligned therewith. Each of said shafts has integral therewith a disc 12, 13 respectively whilst interposed between said discs and arranged coaxially therewith are four discs 14, 15, 16 and 17 rotatably mounted on an extension 10a of the shaft 10. The right-hand side face of the disc 12 as seen in Figure 1 has formed therein three concentric grooves 18 of semi-circular cross-section, there being provided within each of said grooves a lug or abutment 19. The left-hand cooperating face of the disc 14 has also formed therein three similarly shaped concentric grooves 20 which when the disc is positioned on the extension 10a of the shaft 10, register with the grooves 18. Each of the grooves 20 has fixed therein a lug or abutment 21 which, when the discs are assembled is positioned diametrically the lug 19. Interposed between the lugs 19 and 21 of each groove are a pair of helical springs 22, 23, the circular cross-sectional grooves in the associated faces of the discs ensuring satisfactory guiding of said springs during loading of the coupling.

The cooperating faces of the discs 14—15, 15—16, 16—17 and 17—13 are provided with three concentric grooves each having therein an abutment between each pair of which are interposed two springs so that the foregoing description will serve also for the remaining discs. The two springs in each groove may be of unequal length in their normal positions. Thus, in the event of the device being interposed between the driving axle of a road vehicle and the road wheel, the longer springs may serve for forward drive of the vehicle and the shorter springs, in the opposite direction of movement of the driving axle, for rearward movement. In addition the grooves in each disc face may have two or more lugs or abutments therein in which case the springs 22 and 23 are divided into shorter lengths.

What I claim is:—

1. An elastic coupling for coaxial rotary parts comprising discs, and a plurality of annular springs coupling said discs and concentrically disposed at different radial distances from the axis of said discs.

2. An elastic coupling as claimed in claim 1, characterized in that said springs are of helical form and are guided in grooves formed in the cooperating faces of the adjacent discs, said grooves being shaped in cross section to conform with the springs.

3. An elastic coupling for coaxial rotary parts comprising discs, a plurality of groups of annular springs, each group of springs coupling two adjacent discs and the springs of each group being concentrically disposed at different radial distances from the axis of said discs, each group of springs constituting an elastic coupling unit acting independently of the other groups of springs.

PETER LOURENS PRINS.